(12) United States Patent
Sancho

(10) Patent No.: US 6,352,124 B1
(45) Date of Patent: Mar. 5, 2002

(54) AUTOMATIC DEVICE FOR ALL-PURPOSE COUPLING OF AGRICULTURAL IMPLEMENTS AND THE LIKE

(76) Inventor: Juan Pio Mur Sancho, Plaza Padre Sanahuja 1, 25007 Lerida (ES)

(*) Notice: Subject to any disclaimer, the term of this patent is extended or adjusted under 35 U.S.C. 154(b) by 0 days.

(21) Appl. No.: 09/473,069

(22) Filed: Dec. 28, 1999

(30) Foreign Application Priority Data

Dec. 29, 1998 (ES) .............................................. 9802701

(51) Int. Cl.[7] .......................................... A01B 59/043
(52) U.S. Cl. ..................................... 172/439; 172/447
(58) Field of Search ................................ 172/439, 447, 172/448, 446, 450, 443; 280/460.1, 456.1; 180/72, 696, 235, 329

(56) References Cited

U.S. PATENT DOCUMENTS

| 4,519,623 | A | * | 5/1985 | Orthman | 280/461 A |
| 5,601,146 | A | * | 2/1997 | Schlegel et al. | 172/439 |
| 5,697,454 | A | * | 12/1997 | Wilcox et al. | 172/447 |
| 5,975,216 | A | * | 11/1999 | Gibbons | 172/439 |
| 6,089,328 | A | * | 7/2000 | Moore et al. | 172/447 |
| 6,149,180 | A | * | 11/2000 | Haws | 280/479.1 |

* cited by examiner

Primary Examiner—Robert E. Pezzuto
(74) Attorney, Agent, or Firm—Jones, Day, Reavis & Pogue

(57) ABSTRACT

An all-purpose hitch assembly for connecting any one of a variety of implements to a working vehicle. The hitch assembly includes spaced apart arms which are moveable upwardly, downwardly and laterally. There is however, no middle or third link. Instead each arm has a pivotal coupling member, the coupling member having in turn two vertically spaced coupler elements. Each coupling member is attached to a mechanism extending from between the coupler elements to a point about midway of a respective arm. Each of the coupler elements receives coupler complementary elements attached to a coupling frame, which frame is connected to an implement. The coupler complementary elements are arranged on the coupling frame in a generally rectangular disposition. The hitch is safe, easy to use and does not require an additional working person to help make a connection between the working vehicle and the implement.

13 Claims, 13 Drawing Sheets

AUTOMATIC DEVICE FOR ALL-PURPOSE COUPLING OF AGRICULTURAL IMPLEMENTS AND THE LIKE

BACKGROUND OF THE INVENTION

1. Field of the Invention

The present invention relates to an automatic device for all-purpose coupling of agricultural implements and the like.

More particularly, in this invention a system has been devised suitable for coupling the implements or trailers to a tractor or industrial vehicle without requiring to act from the vehicle's outside and without requiring additional workmen, so safely, speedy and comfortably working is obtained therefrom.

2. Description of the Related Art

Presently one can find in the market several types of couplings for farm implements, industrial or construction devices designed for industrial vehicles and the like. In view of the numerous applications of the present invention, the disclosure will specify its use in the farming field because this is the field where the use is widest, however not limiting the application working field of the new invention to this specific sector.

A tractor may couple several farm implements such as a cultivator, a sulphur duster, a trailer, a land leveler, a tank, a rake and the like using three widely-extended coupling systems.

These coupling systems are based on a coupling structure which is located at the tractor's rear side. This structure is made up with two arms securely fixed to the tractor's chassis at the lower side and between the rear wheels, this position allowing a lifting and lowering motion as regards to the ground and a mutually opening and closing motion. The arm's lifting and lowering motion is driven by the pump and the hydraulic pistons from the tractor, and to open and close each of the arms the operator has to lower the tractor and manually do it by means of an externally accessed semiautomatic or manual device. A third supporting member (called third point) is equidistantly placed between the two arms and above them this member is provided with a tensioner which by using a screw or similar allows to approach or separate the end which is hooking the farm implement top portion. Both at the chassis-anchored ends as at the tractor external end, the arms are shaping up a triangle in the three coupling points.

Every farm implement has three coupling points making up a triangle wherein the lower parallel arms and the tractor's third point are hooked with a tensioner to the farm implement's triangle top vertex, the linkage is strengthened by pins and bolts. If the farm implement is securely placed to the tractor's three anchoring points it is then called a mounted farm implement, because its position can be lifted from the ground and its height can be adjusted according to the lifting of the lower arms; said configuration is peculiar of the multi-furrow implement or is requiring height adjustment such as the ploughshares, cultivators, plows and the like. Also there are farm implements which are linked to a tractor only by means of one or two lower anchoring points. These farm implements are called propelled implements because its shape only allowed the tractor vehicle to exert a dragging action thereover, as is peculiarly seen in trailers, tanks, sulphur dusters and the like.

The coupling operation of a farm implement is fully manual, and if we are dealing with a mounted implement the tractor is reversely-driven approached until the arms are facing the farm implement couplings. It is then required the tractor arms are located at the level of the farm implement's lower coupling pins. Later on, the driver may put aside the driving position, lower the tractor and couple each arm to the relative bolt and close the linkage with a pin, the third point is then manually adjusted, the bolt is inserted and the linkage is closed using a pin.

Said full operation is manually performed from the tractor outside, requiring even the aid of a second operator with a high effort from the operator or operators, because usually the farm implement has to be moved with the associated risk of the farm implement unbalance and falling down or having to face the tractor up to the farm implement repeatedly just to locate it better. Usually the users when making this operation become more or less wounded or injured, also they might receive a blow, a pinch, a snag, or a relative gashed scratch.

There are also presently available those couplings called class II and III. Class II couplings are based in that the farm implement lower bolts are having a number of adapted spheres nesting thereafter into the tractor's arms and closed by a latch so that they cannot skip, this is a quicker and easier operation, but this coupling has to be manually pursued, being the same process when dealing with the third point.

Class III couplings carry a bar linking the tractor's two lower arms and the farm implement having two inverted hooks at the connecting triangle base which can directly be nested into the tractor, when the lower arms are lifted and secured with a latch in each hook, which is yielding when the bar is lifted. Also in this assembly arrangement, the devices pertaining to the third point have to be driven from the tractor outside. All this only serves for the mounted implements, because all the dragged implements require another coupling type, quite differently from the mounted implements, which are directly coupled to the tractor chassis; the farm implement currently having a perforation or ring at the end of a boom at its front side and a bolt or pivot provided at the tractor's rear side is made to go through to start a rotation.

SUMMARY OF THE INVENTION

The automatic device for all-purpose coupling of agricultural implements and the like object of the present invention is characterized in that it comprises a device assembly which parts and motions which they may be performing, allowed to couple and uncouple different farm implements, tools and jigs without requiring external tampering, all the operation can practically be carried out from the vehicle. It is intended to improve safety, comfortability, speed and productivity of people who with a vehicle, usually a tractor, had to perform multiple implement changes for the several works carried out in the agriculture, cattle-farming, industry, building field and a number of others operating sectors. The present state of the art is not allowing the farm implements to be coupled in a fully automatic mode from the vehicle itself, meaning that at least an operator shall perform several manual operations from the outside until the farm implement is firmly secured to the vehicle substantially with the personal effort involved in all that, accident risks and additionally when the farm implement if faulty-hooked or undesirably swinging.

As a remedy to all these setbacks, the present invention provides very substantial innovations. All parts to be present in the farm implements for hooking or coupling are unified and rationalized; all the farm implements must have the same standard support for the coupling, with the same shapes, dimensions and sizes. The farm implements should have a number of supports to be balanced and reasonably leveled when remaining standing prior to the coupling operation, so that they can face up the vehicle and be a help in the coupling operation.

Starting with the same three basically clearly-differentiated construable models, applications and features although with slightly different uses and properties have been developed having characteristics making them suitable for any specific particular applications. The operating mechanical base comprises generally hydraulic cylinders, although they can also be pneumatical, and the power is provided by a pump or compressor located at the tractor and driven by the tractor's engine.

In a first development model, the vehicle provided with the new invention has a coupling device comprising two vertically-swinging parallel arms fixed by one end to the tractor chassis at its rear side in an almost parallel shape, and having at its free end a support for securing the farm implements. Each one of these arms is having at the external or internal side, a hydraulic cylinder capable of moving the arm in the transversal sense, concurrently closing or opening both arms, by varying their divergence or convergence, and respective hydraulic cylinders are linked by an end to the tractor's chassis at a collinear point with the shaft outlined by the two linkages of the swinging arms and at the other end by respectively ramming at an intermediate point, the swinging arm having thereby an oblique position between the cylinder and the associated arm.

At a top and equidistant position of the swinging arms the third supporting point is seen comprising a pivoted arm at its linkage with the chassis and vertically swinging and having at its end, a telescopic hydraulic cylinder having at its free end, a U-shaped hook or similar or an open-end top-fitted vertical slider.

In turn, this third top linkage point is respectively associated with each one of the lower swinging arms by means of a pivoted tiered and crossheads and ball-joints at their two ends. The two tierods mutually form an isosceles triangle with its lower side of variable dimensions. This structure allowed to drive the third point by using the tiered pulling or displacement concurrently exerted by both lower swinging arms. The upwardly or downwardly swing of the swinging arms is causing the same motion on the arm of the third point. Also the swinging arms opening or closing operation by means of the tensioning cylinders is causing a triangle strain performed by the tierods between the arms, thus giving way to a vertical motion at the free end of the third point.

Consequently, the farm implement shall have at its lower side a standard coupling made up with an isosceles triangle configuration structure having two horizontally-arranged bolts or similar, one at each side of the base, and at the top end, a suitable area for nesting into the slider located at the end of the arm associated with the tractor's third point.

The farm implement coupling operation to the tractor is simple. After facing up the tractor rear side to the farm implement's front side, the lower swinging arms are placed in an opened position, at the height of the farm implement's lower bolts and the automatic closing of each said arms is then performed, by means of the action of the tensioning cylinders. The swinging arms approaching motion is straining the triangle formed by the tierods and upwardly pushes the arm of the third point. The arm motion combined with the end telescopic motion of said arm is suitable to nest the hook into the slider with the farm implement's anchoring top-sided triangle. After the lower arms have abutted with the farm implement structure, the third point is then adjusted using the telescopic arm and the farm implement remained secured and ready for use. All these operations are performed from the driver's seat by the driver, using the acting controls of the relevant hydraulic cylinders in a comfortable, speedy and safety way.

The farm implement uncoupling operation is quite analogous but contrariwise. After resting the farm implement on the ground, it is only required to open the separation between the swinging arms, and the lower supports will then be released from the farm implement of said arms. During this motion the tierods make the third point's arm to go downwardly and this point can then be removed by using the telescopic cylinder.

In the cases when farm implements are assembled carrying a takeoff from the tractor and hydraulic pressure tappings to perform several functions, it has been foreseen that the mechanical takeoff hung from the arm of the third point by means of a chain or spring, and also the hydraulic pressure tappings are placed at an easily accessible location for the driver, so the seating position is not left aside. In the farm implement, the takeoff is secured in a similar way and the hoses of the hydraulic pressure tappings are seen secured by means of flexible canes making easy a comfortable access when the farm implement is already coupled and also a speedy connection.

For the coupling of a trailer or a dragged farm implement it has been envisaged that said implement has at the end of the coupling front boom, a hooking jig made up with a horizontal bar having at the ends the appropriate anchoring supporting bolts similar to those seen in the previously cited standard coupling triangle. Said bar having at its central point a hole going through from it a vertically-projected bolt of the boom which allows its rotation in a horizontal plane. This coupling also having two reacting springs such that in the rest position the coupling is perpendicularly located to the boom and thereby suitable to be rammed by the tractor.

The coupling operation is easily performed and simply and only requires to face up the tractor rear side with the boom and then close the opening between the tractor's lower swinging arms, when the implement or trailer coupling supports had abutted with the ends of the arms receiving them so the operation is completed thereby. To release the implement or trailer is only required to open the opening between the tractor's swinging arms and uncoupled the implement thereby from the tractor.

The use of this invention may become in several practicable embodiments. A second construable model does not need the third point, its building basically consists in what follows. The tractor having at the rear side and between the wheels, two vertically-guided swinging arms fixed to one end of the tractor chassis and each arranged in an almost parallel way. Both arms having at its free end a hingely-pivoted vertical member having at its vertical projection, two holes, each with a supporting point or points and between these two supporting points a vertical slider can be seen being run by a bolt or sliding contact provided at the end of a hydraulic cylinder, the body of which is parallel to the swinging arm and is strongly interlocked thereto. In the same way that at the first construable model, each one of the two swinging arms is having linked thereto an obliquely hydraulic cylinder which is suitable thereby to give to the arm a transversal motion from one side to the other. This cylinder is fixed by one end to the tractor chassis by using a pivoting member located at a phantom line between the pivoting member linkages of both swinging arms and the opposite end fixed to an intermediate point in the relative swinging arm.

In this way the swinging arms are having a distinctive motion allowing its reciprocating vertical displacement, an opening or closing operation of their mutual convergence and the cylinders which are pivoting the support movable member placed at the end of the arms, allowing a swing of said members upon a variation of the tilting.

Moreover, the farm implement shall have a coupling device made up with a squared frame located at the front side of the linkage, and this frame shall have at each side, a pair of horizontally projecting bolts or supports matching in shape and arrangement with the hole drilled in the movable member provided in the swinging arms.

For the farm coupling, the implementation is simply, because it is only required to face up the tractor's swinging arms with the previously cited supports located at the implement coupling. The opening is subsequently caused between the tractor's swinging arms and the cited supports are then located in the relative holes suitable to receive them in the swinging arms until the abutment is obtained. In this way, the farm implement is integral with the movable parts at the ends of the swinging arms.

A third construable model of the invention has a differentiated system having a greater mechanical stiffness. The design of this model basically comprises two parallel-arranged swinging arms at the tractor's rear side and between the wheels. These parallel arms cannot vary their divergence by opening or closing their opening and only have the concurrently vertical swinging motion. At the end of each arm can be found a vertically-positioned pivoted hydraulic cylinder. This piston downwardly has a U-shaped fork or member and at the extensible top end, another similar fork. This vertical piston can be swinging from front to back due to the operation of an ancillary hydraulic cylinder having a pivoted end at a projecting support of an intermediate point of the swinging arm and at the pivoted opposite end in an intermediate point of the vertical hydraulic cylinder. In this way, the extension of this ancillary hydraulic cylinder allows to vary the rake of the vertical hydraulic cylinder provided with the forks.

Each vertical hydraulic cylinder is suitable for being arranged between two pairs of supports in the farm implement to be coupled. After the hydraulic cylinder is located between the farm implement supports, the forks extension is nesting each cylinder between relative pairs of supports, securing in this way the farm implement to the tractor vehicle.

Finally, it shall be emphasized that in the description of the three development models, an idea was propounded in the sense that the system is located at the vehicle rear side, because in the farming applications this is the most general arrangement. However the device might also be arranged at the vehicle front side without any properties or operating variations, being this case mostly appropriate for specific vehicles or the like such the ones in the transport or warehouse fields.

To fill up the description that is following suit, and to help in a better understanding of its features, the present descriptive specification is attached with a set of drawings which figures illustratively and non-exhaustively are showing the most relevant details of the invention.

DESCRIPTION OF THE PREFERRED EMBODIMENTS

In view of the cited figures and according to the adopted numbering, it can be seen in the figures a preferred embodiment, although non-exhaustive of the invention, which can construably be according to three previously cited models.

The first model is suitable for tractors working with the sensible point relative to the effort at the third point. With this model, the displacement of the third anchoring point can widely be varied forwardly and rearwardly without any effort problems thereto.

The second and third models are suitable for tractors working with the sensible point relative to the effort in the lower bars. That is, the lower bars bear a higher pressure of longitudinal traction or weight suspension, without calling for a requirement that third point had a large longitudinal effort or motion forwardly and rearwardly.

Example of a preferred embodiment for the first development model.

Figure 3:
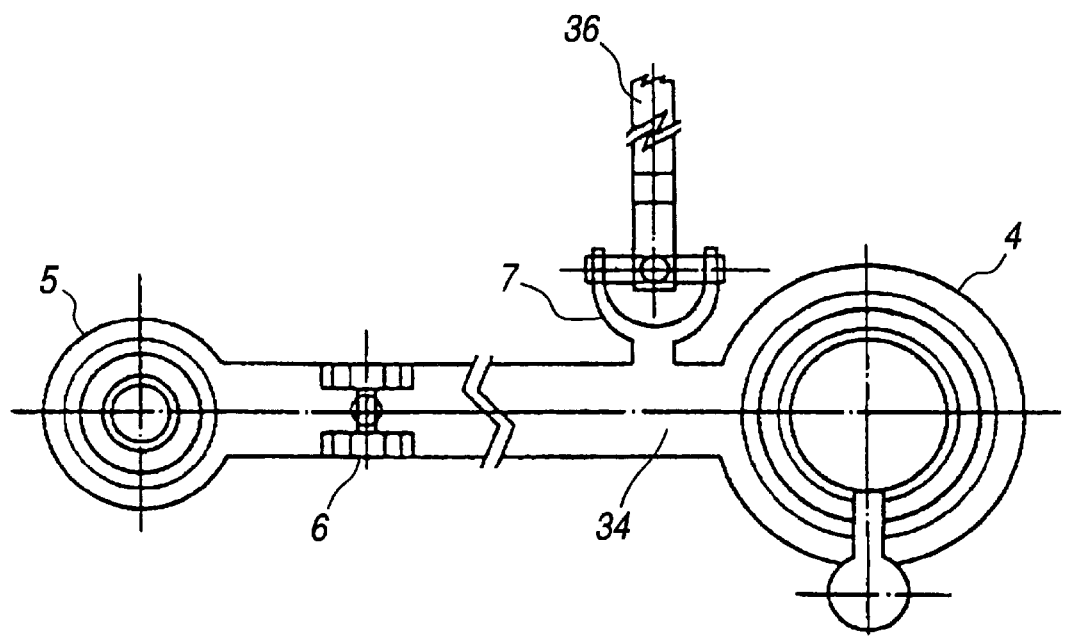
FIG. 3 is a detail in elevation of the swinging arm (34) (first model).
Figure 5:
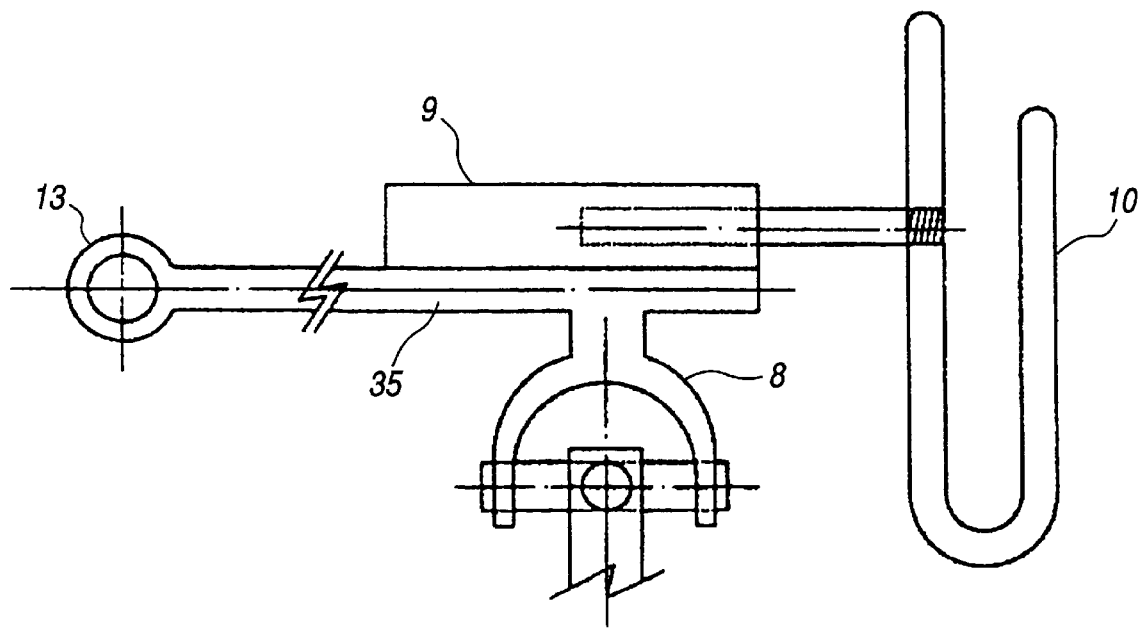
FIG. 5 is a detail of the top arm (35), hydraulic cylinder (9) and hook (10) (first model).
Figure 6:
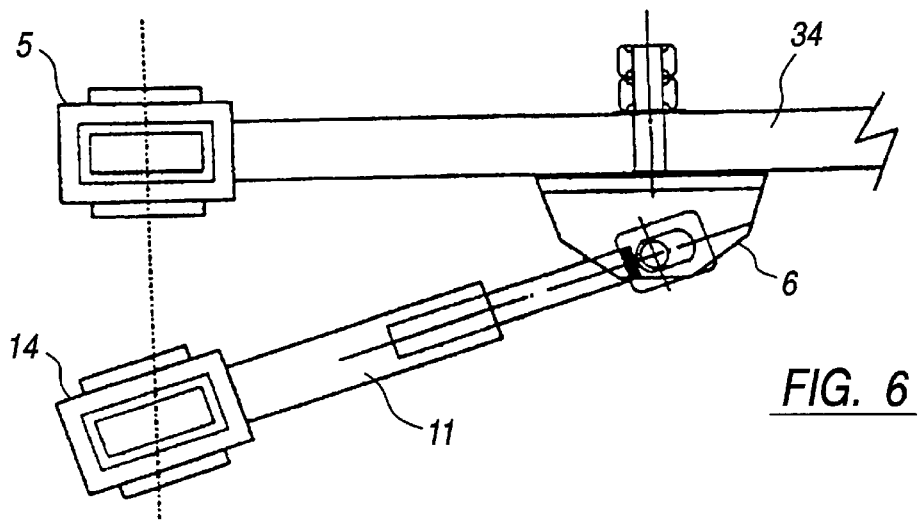
FIG. 6 is a partial plant view of the lower arm (34) and hydraulic cylinder (first model).

The vehicle provided with the new invention has a coupling device at its rear side comprising preferably three arms (34a, 34b, 35) (FIG. 3, FIG. 5) fitted to the chassis. At the lower side, two arms (34a, 34b) parallel and symmetrical with each other can be seen horizontally arranged and each pivoted to the chassis at an end (5) and with the possibility of vertically swinging. Each arm (34) is laterally related to a hydraulic cylinder (11) (FIG. 6), laterally and obliquely arranged, this hydraulic cylinder (11) being secured at an end to a ball joint (6) located at an intermediate point of said arm (34) and at the other end to a pivoting member (14) and to the vehicle chassis located at a collinear point with the cited shaft by the two couplings (5a, 5b) to the arms' chassis (34a, 34b). At the free end of each arm (34) an implement securing support (4) is seen thereto.

Between both arms (34a, 34b) and a remarkable top and equidistant position of each one, a third arm (35) (FIG. 5) is pivotedly fitted to the chassis (13), this arm having at its free end a telescopic hydraulic cylinder (9) showing at its end, a sliding hook (10) or fork.

Figure 4:
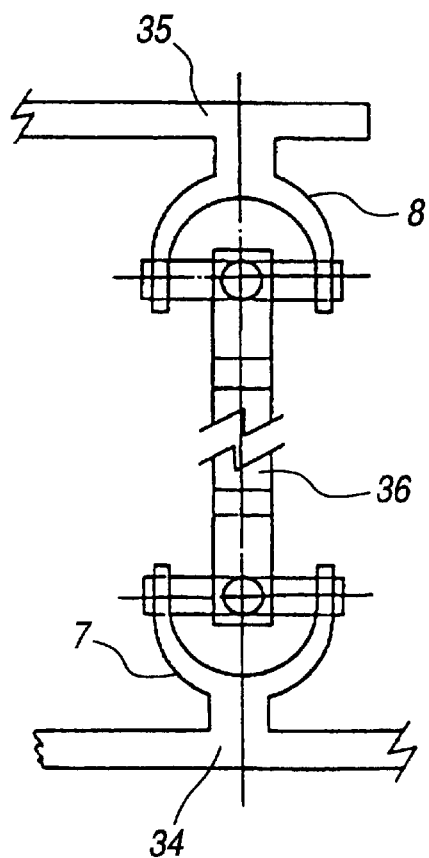
FIG. 4 is a detail of the tiered (36) linking the swinging arm (34) with the top arm (35) (first model).

The top arm (35) is mechanically related with each one of the lower arms (34a, 34b) by means of two tierods (36a, 36b) (FIG. 4). These tierods (36a, 36b) are pivoted at their ends, at an intermediate point of each arm by means of ball joint (7a, 7b, 8), crossheads or similar.

Figure 1A:
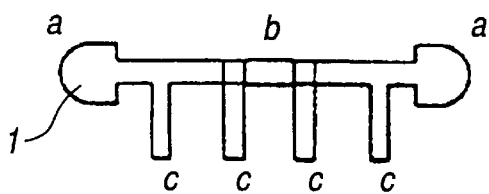
FIG. 1 is a profiled, plant view in elevation of the triangular support (1) to be fitted in the mounted farm implements (first model).
Figure 1B:
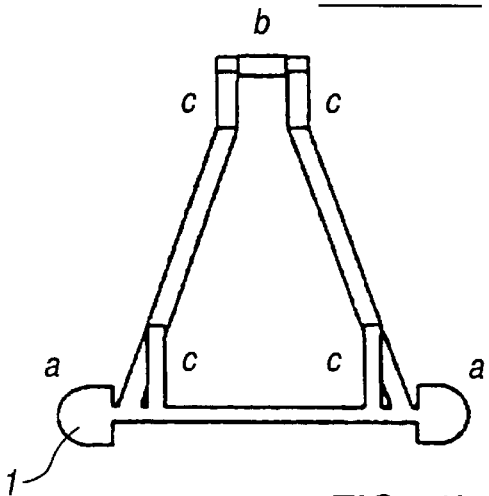
Figure 1C:
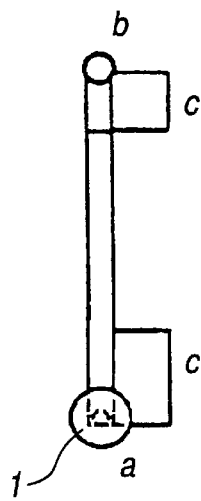
Figure 2A:
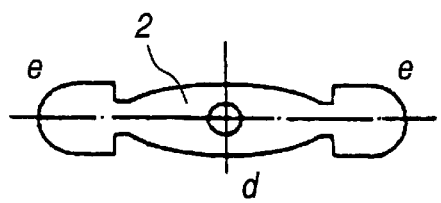
FIG. 2 is a profiled plant view in elevation of the support (2) for dragged farm implements and an assembly example of the part in the implement boom (3) (first model and second model).
Figure 2C:
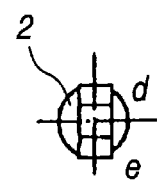
Figure 2B:
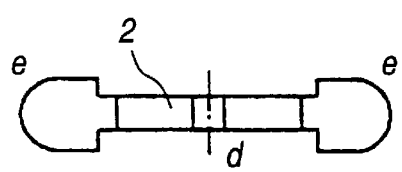
Figure 2D:
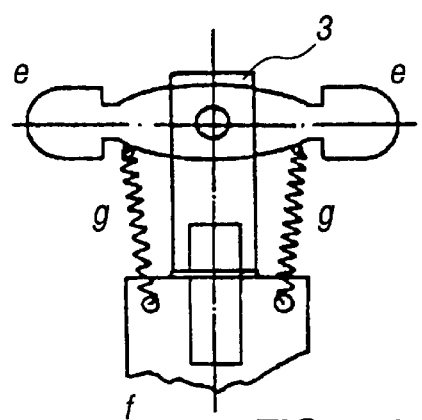

The mounted implement suitable for coupling with the cited system has at its front side a standardized structure comprising a frame (1) (FIG. 1) in the shape of an isosceles triangle having two horizontal elongations (a) at its base, one at each side, preferably with a cylindrical shape and topped by a hemisphere. The triangle (1) showed, at its top side, designed for fitting the arm associated to the third point, a rotating horizontal cylindrical bushing (b) which can be detached by means of a pin. Said triangular structure (1) showed several anchoring members (c) with the farm implement fully distributed.

For the coupling of the dragged implements, they have to be provided with a connection boom (3) (FIG. 2) with a transversal coupling comprising a bar (2) at its ends being provided with two cylindrical terminals (e) topped at the ends by a hemisphere suitable for being accepted by the tractor coupling (4), and at the intermediate point of said coupling a hole (d) is drilled for a vertically projecting bolt to go through from the boom (3) and a rotation is allowed according to a vertical shaft. The coupling (2) is kept perpendicularly to the boom (3) in the uncoupling position due to the action of the tensioning springs (g).

Figure 7:
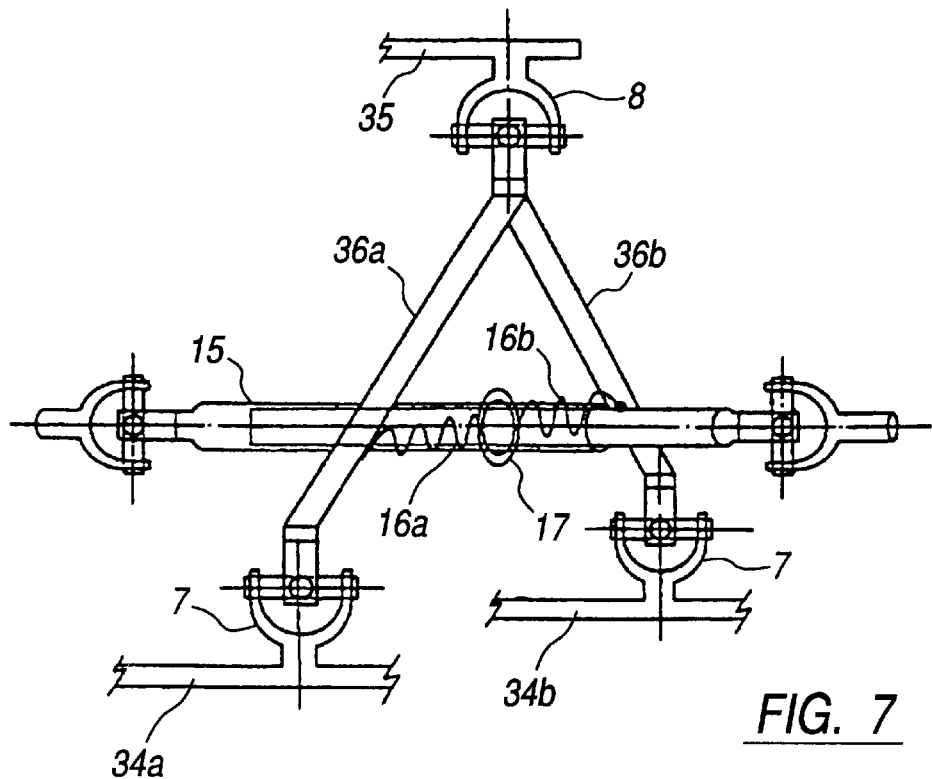
FIG. 7 is a perspective view of the hung takeoff (15) from the coupling structure (first model).
Figure 8:
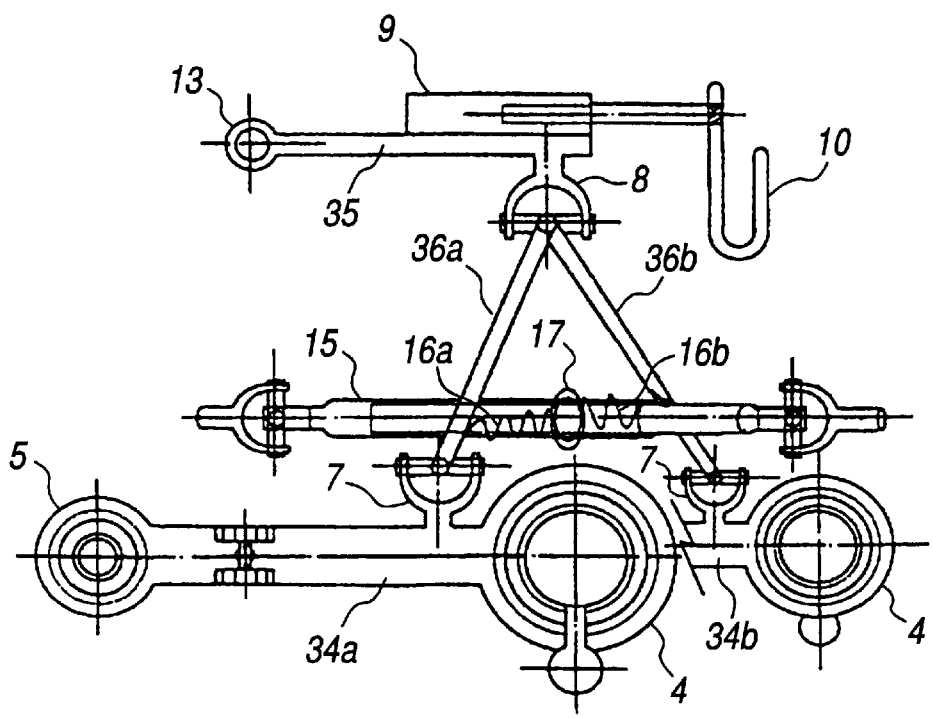
FIG. 8 is a perspective view of the coupling structure assembly arranged at the rear side of a tractor (first model).

With the intention to fix a takeoff bar (15) (FIG. 7), the bar is seen overhead between the tierods (36a, 36b) by means of a chain or two springs (16a, 16b) having overhead a bearing (17) to secure the bar. FIG. 8 showed an assembly of the first development model.

Example of a preferred embodiment of the second development model.

Figure 11A:
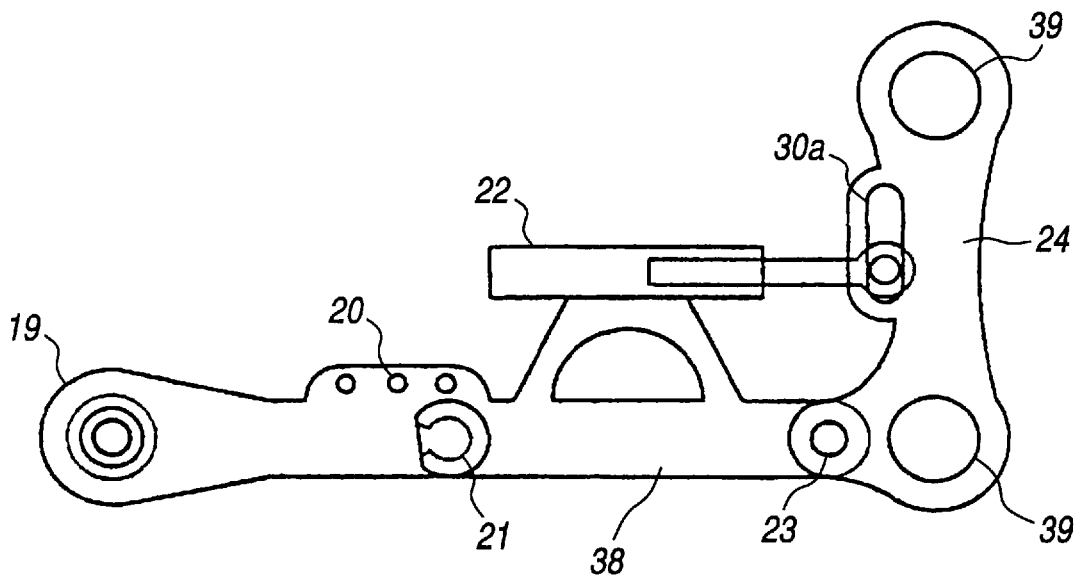
FIG. 11 is a plan view in elevation of the assembled swinging arm (38) excepting the cylinder (11) (second model).
Figure 11B:
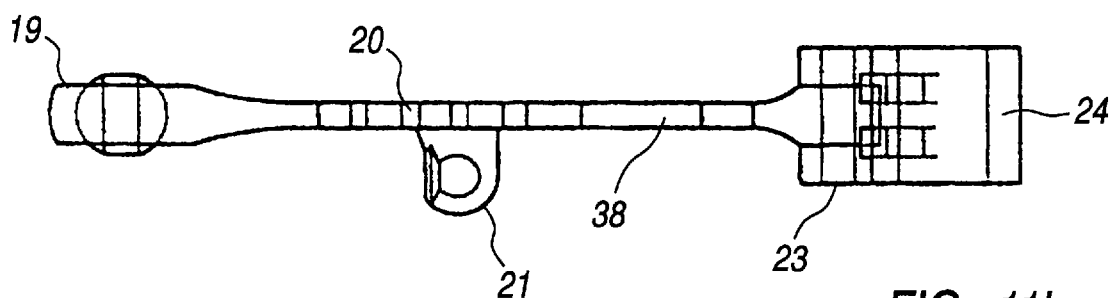
Figure 12A:
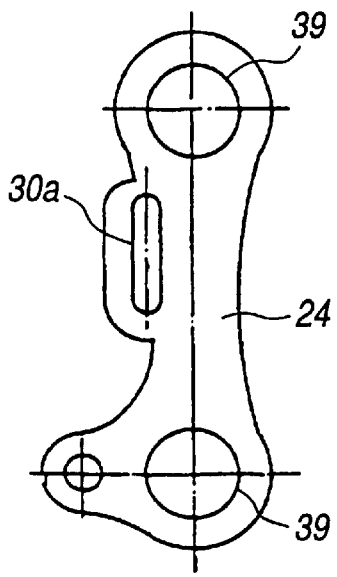
FIG. 12 is a profiled, plant view in elevation of the coupling part (24) provided in the swinging arm (38) (second model).
Figure 12B:
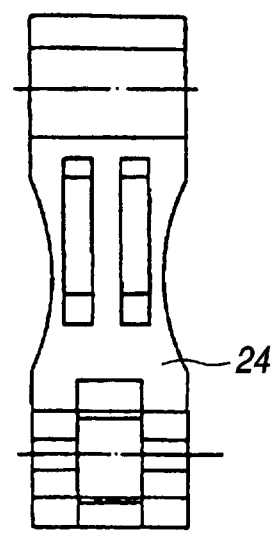
Figure 12C:
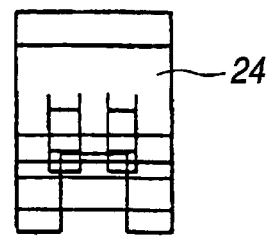
Figure 13:
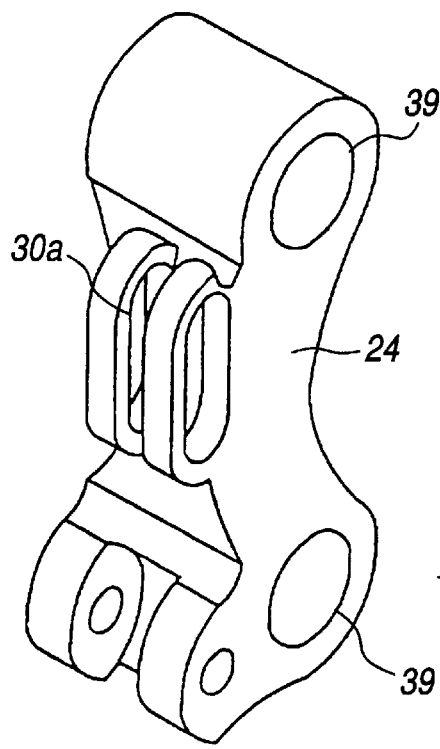
FIG. 13 is a perspective view of the coupling part (24) provided in the swinging arm (38) (second model).
Figure 24A:
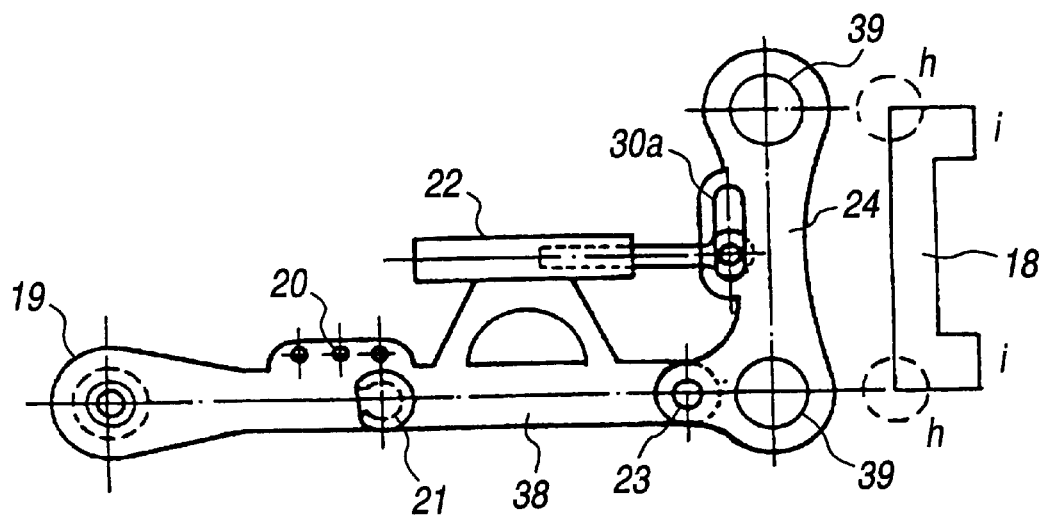
FIG. 24 is a plant view in elevation of the swinging arm (38) (second model).
Figure 24B:
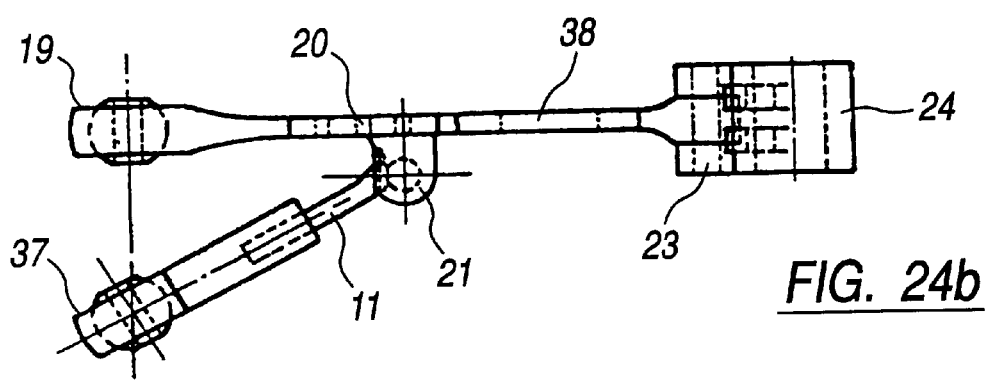
Figure 25:
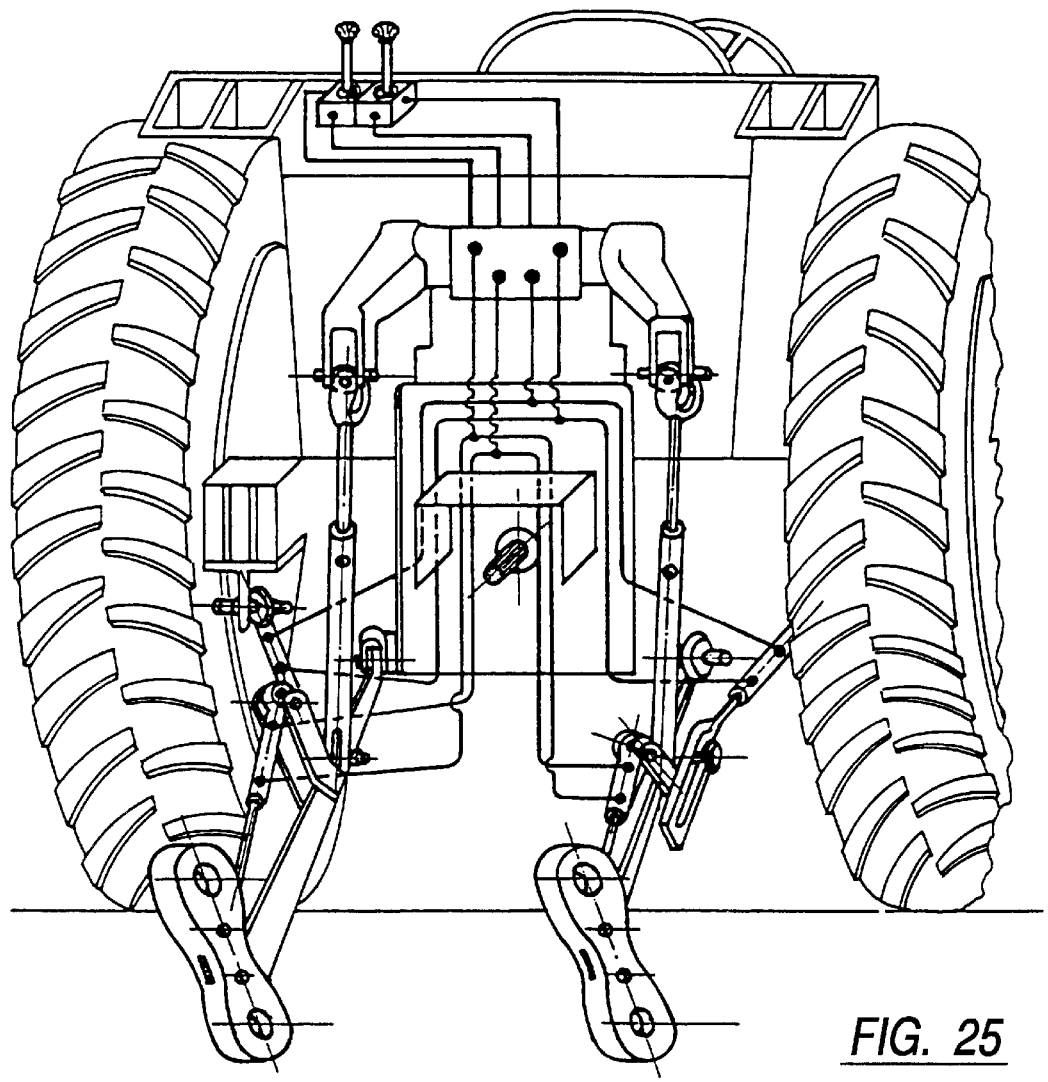
FIG. 25 is a perspective view of the automatic device anchoring fitted on the tractor.
Figure 26:
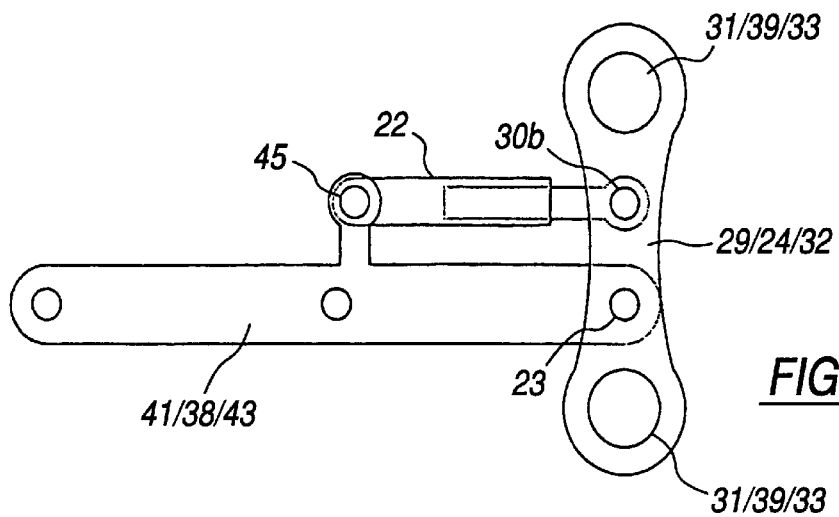
FIG. 26 is a view in elevation of the arm (41) or (38) or (43) showing an alternative arrangement of the pivoting member (23) in the clamping part (29) or (24) or (32) (second or third models).

In a second preferred embodiment the vehicle comprises a coupling device preferably at its rear side, provided with two equal arms (38a, 38b) (FIG. 11) and parallel and horizontally arranged fitted to the chassis by means of a ball joint (19a, 19b) and with the possibility of reciprocatingly swing and concurrently mutually being opened and closed. Each arm is related with a hydraulic cylinder at the holes (20), which deliver to both arms (38a, 38b) a upwardly and downwardly motion in a concurrent way. In turn, each arm (38a, 38b) is laterally associated with a laterally obliquely-arranged hydraulic cylinder (11) (FIG. 24), this hydraulic cylinder (11) being fitted by one end to a ball joint (21) located at an intermediate point of said arm (38) and to the other end with a pivoting member (3) placed at a collinear point with the cited shaft by the two couplings (19a, 19b) to the tractor chassis. At the free end of each arm (38) a coupling part (24) with the implement is seen. Said part (24) is pivoted to the arm (38) by means of the pivoting member (23) which allows to said part (24) to have a limited forwardly and rearwardly rotation. The coupling part (24) has elongated shape to the high, and two transversal and going through holes are drilled therein suitable to receive the supports (18) (FIG. 9) of the farm implement coupling. The part (24) having alongside a sliding groove (30a) run by a bolt or slider provided at the end of the hydraulic cylinder (22). Said hydraulic cylinder (22) is parallel to the arm (38) and fitted by its body with said arm (38). The free and projected arm towards the part (24) has at the end the previously cited bolt or slider inserted into the groove (30a) of the part (24). In a standardized embodiment the pivoting member (23) existing at the coupling part (24) is placed at the same height that the lower hole (39) for tractors sensible to the efforts in the lower arms (38). But as an alternative construction for tractors sensible to the effort at the third point, the part (24) has said pivoting member (23) at an intermediate point which improved the effort distribution at the pair of holes (39) (FIG. 26).

Figure 9A:
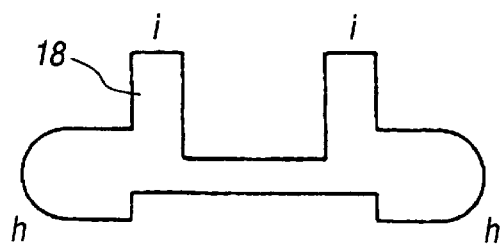
FIG. 9 is a profiled, plant view in elevation of the supporting structure (18) in the mounted farm implements (second model)
Figure 9B:
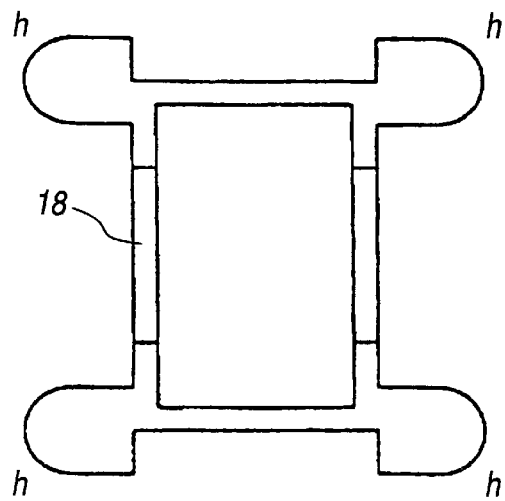
Figure 9C:
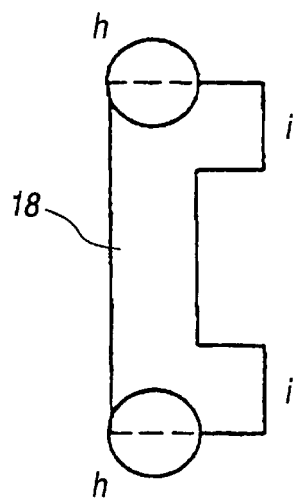

The mounted implement suitable to be coupled with the disclosed coupling device has to be provided at its front side with a standard coupling structure (18) (FIG. 9). This standard coupling structure (18) has the shape of a rectangular frame, having at each side, a pair of supports (h) horizontally projected in a cylindrical way with the topped end in a hemispherical shape or similar, suitable to nesting into the holes (39) drilled in the coupling part (24). The frame (18) having in turn four extensions (i) for welding or assembly on the farm implement.

Figure 10A:
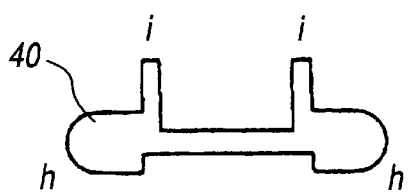
FIG. 10 is a profiled, plant view in elevation of a supporting variable (40) in the mounted farm implements. With the chance of securing at different heights (second model).
Figure 10B:
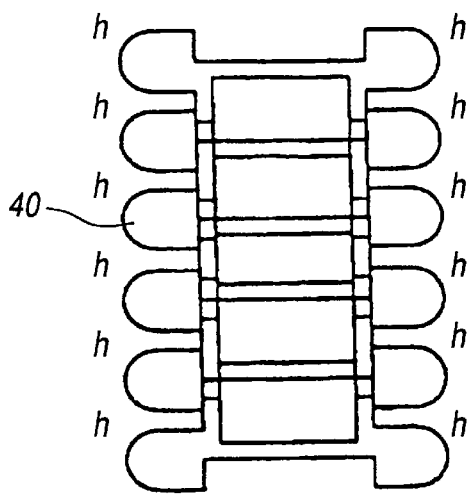
Figure 10C:
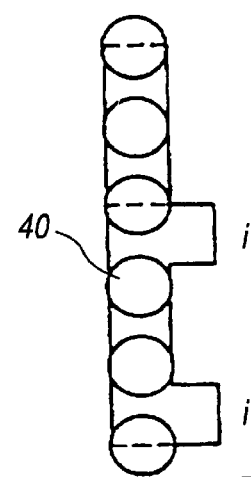

In a coupling variable (18), being suitable so that the implement can be arranged at several heights as related to the tractor coupling, a similar structure (40) (FIG. 10) to the disclosed structure (18) arranged on the farm implement has been envisaged but substantially higher at the top and having several height-overlapped supporting sets at both sides, such as the tractor can be coupled in a supporting set (h) associated to the desirable height.

For the coupling of the dragged implements, these implements have to be provided with a connection boom (3) (FIG. 2) with a transversal coupling made up with a bar (2) having at its ends, two cylindrical terminals (e) topped at the ends by a hemisphere suitable for being accepted into the hole (39) of the part (24), at the intermediate point of said coupling is drilled a hole (d) to go through a vertically projecting bolt from the boom (3) allowing its rotation according to a vertical shaft. The coupling (2) is kept perpendicularly to the boom (3) in the uncoupling position due to the effect of two tensioning springs (g).

Figure 17A:
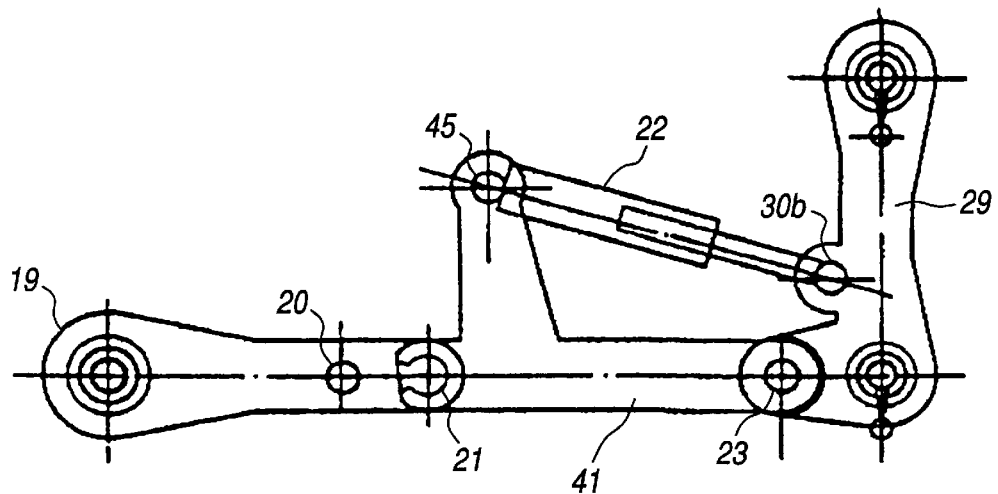
FIG. 17 is a plant view in elevation of the assembled swinging arm (41) excepting the cylinder (11) (second improved model).
Figure 17B:
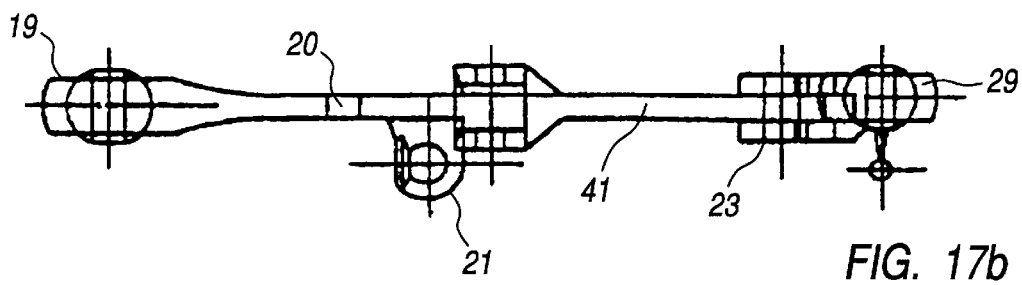
Figure 18A:
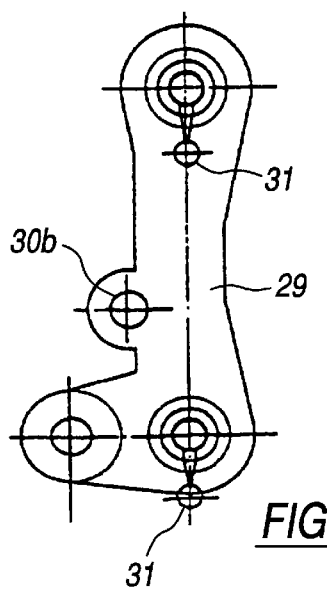
FIG. 18 is a profiled, plant view in elevation of the coupling part (29) provided in the swinging arm (41) (second improved model).
Figure 18B:
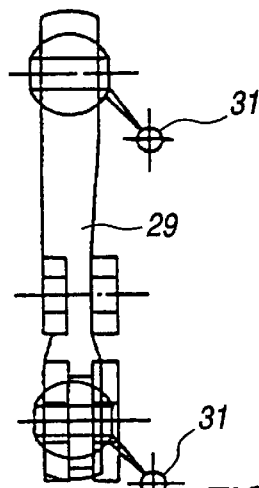
Figure 18C:
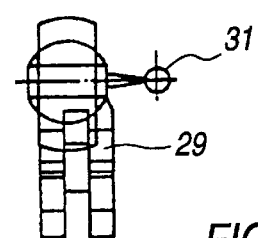
Figure 19:
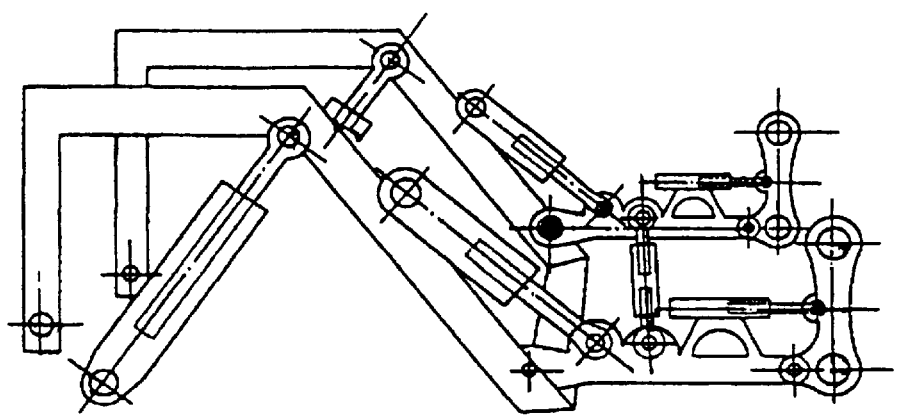
FIG. 19 is perspective view of the second invention model coupled to the structure of the shovel arranged at the front side of a tractor.

The second development model accepts a modified embodiment providing mechanical simplicity and rigidity improvements. This second improved development model comprises two equal symmetrical and parallel arms (41a, 41b) (FIG. 17) similar to the arms (38a, 38b) but differentiated when the cylinder is embossed at a diverse position. The cylinder (22) has a pivoted end over a projecting support (45) perpendicularly to an intermediate area of said arm (41) and the opposite end of said cylinder (22) is pivoted in turn at a point (30b) of the coupling part (29). The holes (39) drilled at the coupling part (24) are replaced by drilled spheres (31) (FIG. 18). These drilled spheres having a counterweight for their stability.

Likewise than in the second construable model, the embodiment of the second improved model accepts a modification of the pivoting member position (23) showed in the coupling part (29). It can be located at the same height than the lower hole (31) or as an alternative construction for tractors sensible to the effort in the third point, the part (29) having said pivoting member (23) at an intermediate point between both coupling spheres (31) (FIG. 26) improving effort distribution between said pair of spheres (31).

Figure 14A:
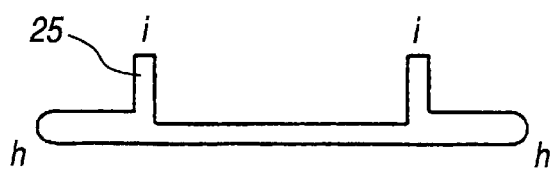
FIG. 14 is a profiled, plant view in elevation of the supporting structure (25) in the mounted farm implements (second improved model).
Figure 14B:
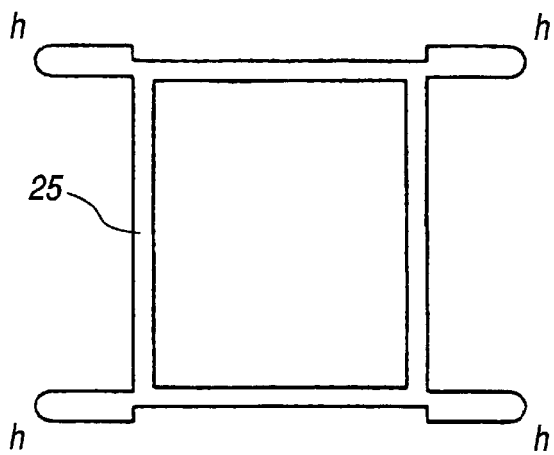
Figure 14C:
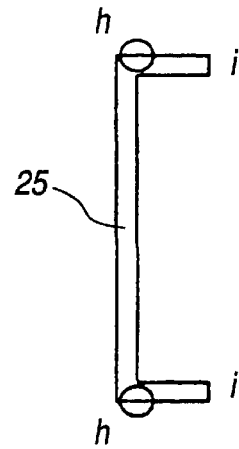
Figure 15A:
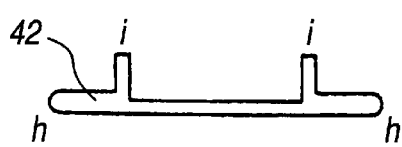
FIG. 15 is a profiled, plant view in elevation of the supporting structure (42) in the mounted farm implements. With the chance of securing to different heights (second improved model).
Figures 15B, 15C:
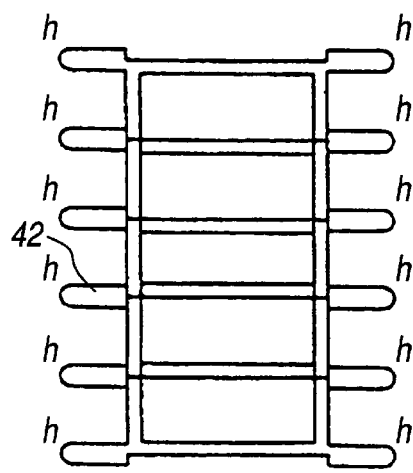
Figure 16A:
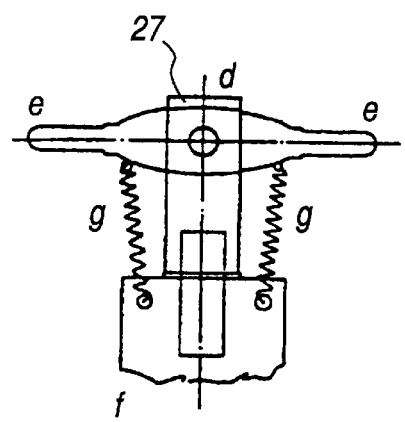
FIG. 16 is a profiled, plant view in elevation of the support (26) for dragged implements and an assembly example of the part in the boom (27) of the farm implement (second improved model).
Figure 16B:
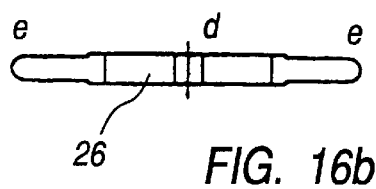

The couplings (25, 26, 42) (FIGS. 14, 15, 16) both mounted and dragged ones are fully analogous with the morphology natural differences making them suitable for assembly to the part (29) of the second improved model.

Example of a preferred embodiment for the third development model.

Figure 21:
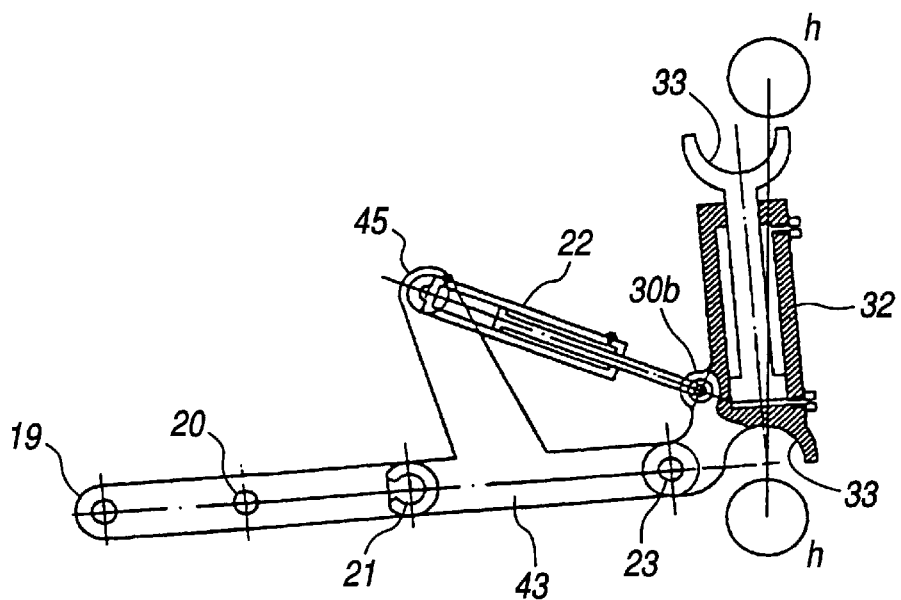
FIG. 21 is a view in elevation of the assembled swinging arm (43) (third model).
Figure 22A:
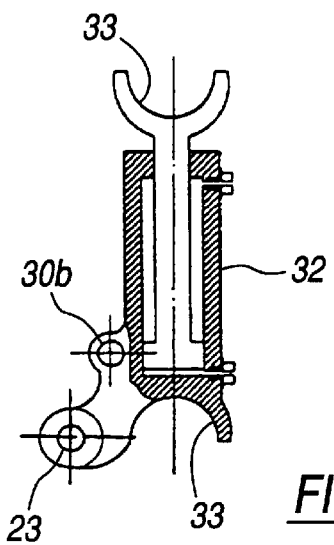
FIG. 22 is a profiled, plant view in elevation of the coupling part (32) provided in the swinging arm (43) (third model).
Figure 22B:
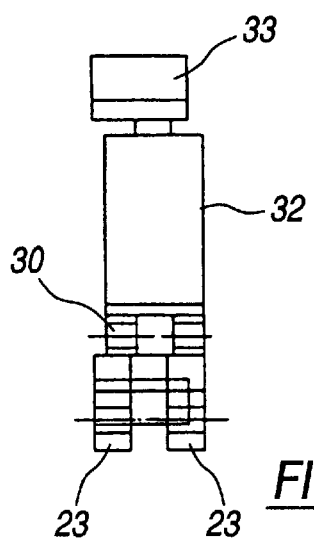
Figure 22C:
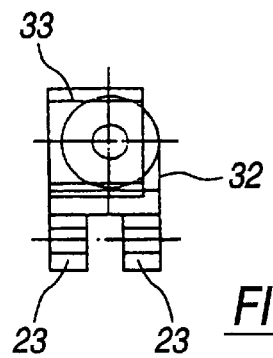
Figure 23:
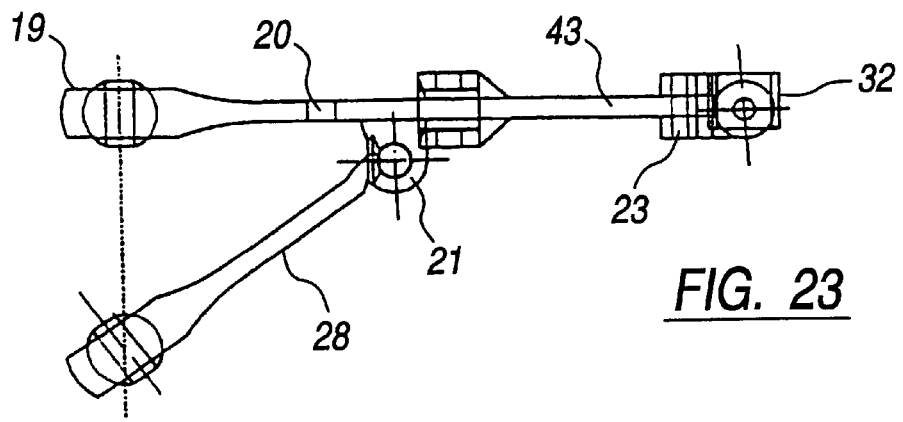
FIG. 23 is a plant view of the assembled swinging arm (43) (third model).

It has been invisaged that the vehicle provided with the new invention has a coupling device at its rear side preferably comprising two symmetrical, parallel and mutually integrated arms (43) (FIG. 21) in a way that both have a concurrently vertical swinging motion. Each arm (43) having at the tractor's rear end, a pivoting member (19) whereon said arm (43) is swinging. At a point of the arm and near to the pivoting member (19) a hole (20) is drilled, at this point the hydraulic cylinder responsible for giving the vertical swinging motion to the arm is pivoted thereto. At an arm (43) intermediate point, a vertically-projected support is provided having a hydraulic cylinder (22) in a pivoting member (45), at its end, the opposite end of the cylinder is ramming a pivoting member (30b) at an intermediate point of the vertically-arranged part (32) which in turn is pivoted, at the lower part, with the arm (43) by means of the pivoting means (23). The coupling part (32) is basically made up with an extendable hydraulic cylinder having fork-like configurations at both ends.

Figure 20A:
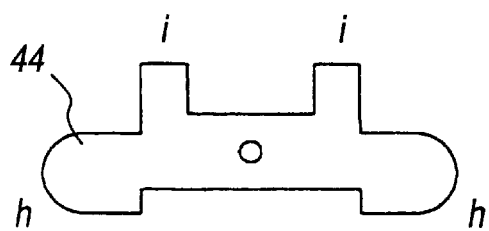
FIG. 20 is a profiled, plant view in elevation of the supporting structure (44) for the dragged farm implements (third model).
Figure 20B:
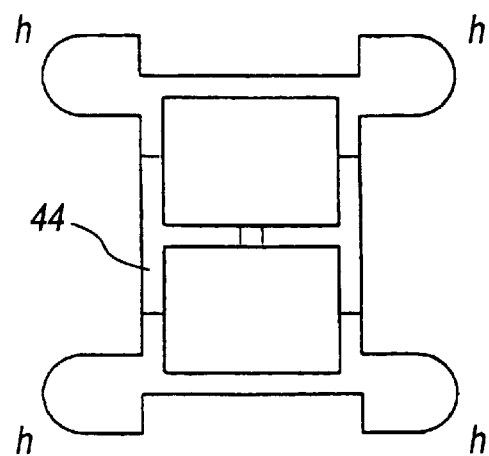
Figure 20C:
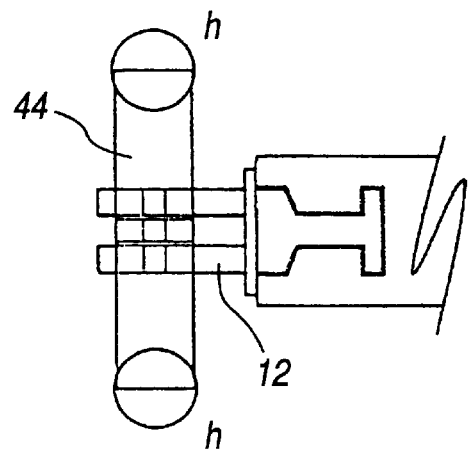

The mounted farm implement itself has at its front side, a coupling structure (44) (FIG. 20) comprising a rectangular frame with two supporting pairs (h) horizontally projecting from each side, and with a cylindrical shape provided with a hemispherical-rounded end. The frame having at its rear side, some projections or flanges (i) suitable to be integrated with the implement by welding o similar assembly. For the dragged implements the same coupling structure (44) can be used which has at its center area, a transversally-located horizontal cross member which at its intermediate point has a hole drilled suitable for a bolt to go through, this bolt placed at the end of the implement's boom (12) to allow its horizontal pivoting motion.

All the described parts, models and functions are not to be understood exhaustive, particular and single for each model; the part combination of the diverse models gives way to a new construable understanding also contained in the present specification and consequently being protected and disclosed by the combination of the described characteristics for each part.

I claim:

1. An all-purpose hitch assembly for coupling any one of a variety of implements to a working vehicle comprising:

a first arm having a near end portion and an extended free end portion;

a second arm having a near end portion and an extended free end portion;

each of said first and said second arms being connected at spaced apart locations to said working vehicle at said near end portion and said arm extending away from said vehicle;

a first mechanism connected to said working vehicle and to said first arm for moving said first arm in relation to said vehicle;

a second mechanism connected to said working vehicle and to said second arm for moving said second arm in relation to said vehicle;

a first coupling member being pivotally connected to said extended free end portion of said first arm;

a second coupling member being pivotally connected to said extended free end portion of said second arm;

each of said coupling members having two spaced apart coupler elements, one of said elements being lower and the other of said elements being higher;

a third mechanism connected to said first arm between said near and extended end portions and connected to said first coupling member between said two spaced apart coupler elements for moving said first coupling member;

a fourth mechanism connected to said second arm between said near and extended end portions and connected to said second coupling member between said two spaced apart coupler elements for moving said second coupling member; and a coupling frame connected to said implement and having two pairs of coupler complementary elements, one of said pairs of coupler complementary elements for engaging said two spaced apart coupler elements of said first coupling member and the other pair of coupler complementary elements for engaging said two spaced apart coupler elements of said second coupling member.

2. An apparatus as claimed in claim 1 wherein:

said coupling frame has a rectangular shape with four corners; and said two pairs of coupler complementary elements are located at the four corners of said frame.

3. An apparatus as claimed in claim 1 wherein:

each of said coupler complementary elements is hemispherical in shape.

4. An apparatus as claimed in claim 1 wherein:

said frame includes a horizontal cross member.

5. An apparatus as claimed in claim 1 wherein:

said frame includes more than two pairs of coupler complementary elements.

6. An apparatus as claimed in claim 1 wherein:

said first, second, third and fourth mechanisms each include a hydraulic cylinder.

7. An apparatus as claimed in claim 1 wherein:

each of said coupling members are connected to an arm so as to align the lower one of said coupler elements with the extended free end of said arm.

8. An apparatus as claimed in claim 1 wherein:

each of said coupling members are connected to said arms between said higher and lower coupler elements.

9. An apparatus as claimed in claim 1 including:

a fifth mechanism connected to said vehicle and to said first arm; and a sixth mechanism connected to said vehicle and to said second arm.

10. An apparatus as claimed in claim 1 including:

a post formed between said near and extended ends of each arm for connecting said first and said second mechanisms.

11. An apparatus as claimed in claim 1 including:

hydraulic cylinders formed between said coupler elements.

12. An apparatus as claimed in claim 11 wherein:

said coupler elements are U-shaped.

13. An apparatus as claimed in claim 1 wherein:

said frame includes terminal sections for being connected to said implement.

* * * * *